United States Patent [19]
Ajdukovic

[11] 3,946,815
[45] Mar. 30, 1976

[54] LAWN EDGING AND SOD CUTTING DEVICE

[76] Inventor: Marko Ajdukovic, 26536 Woodingham, Warren, Mich. 48091

[22] Filed: Mar. 12, 1975

[21] Appl. No.: 557,607

[52] U.S. Cl.................................. 172/17; 172/19
[51] Int. Cl.².......................................... A01B 45/04
[58] Field of Search............ 172/15, 16, 17, 18, 19, 172/20

[56] References Cited
UNITED STATES PATENTS

| | | | |
|---|---|---|---|
| 1,214,597 | 2/1917 | Schneider | 172/17 |
| 1,562,174 | 11/1925 | Johnson | 172/16 |
| 1,885,073 | 10/1932 | Broemme | 172/17 |

FOREIGN PATENTS OR APPLICATIONS

| | | | |
|---|---|---|---|
| 228,199 | 5/1959 | Australia | 172/13 |

*Primary Examiner*—George J. Marlo

[57] ABSTRACT

The present application discloses an invention whereby the common gardening tasks of sod cutting and lawn edging may be performed by a single tool. By providing a structural member of thin cross section and generally rectangular shape with a reinforcing member along its top edge, a suitable handle, and a pair of removable wheels, one on each side of said member, with one of said wheels being a larger lawn edging wheel and the other being a smaller sod cutting wheel, a dual-purpose lawn and garden tool is provided.

With the small sod cutting wheel mounted in the appropriate position, the sharpened leading edge of the structural member will easily cut sod, and with the smaller wheel removed and the larger wheel mounted, the lawn edging operation can be performed. Removable spacer members of varying widths, and a deflector member, combine to determine the width of cut and direct the pieces of sod away from the trench produced.

6 Claims, 7 Drawing Figures

LAWN EDGING AND SOD CUTTING DEVICE

This application discloses an improved dual purpose tool for use around the home, and, more specifically, discloses a dual purpose lawn and garden tool whereby the tasks of sod cutting and lawn edging may be speedily and economically performed by a simple, relatively inexpensive tool, in place of the two tools previously necessary.

Heretofore, when the garden enthusiast desired to remove a piece of sod for the purposes of planting a garden or for various other purposes, it was necessary for him to procure a separate sod cutting tool specifically designed for this purpose, or to use a common, ordinary household knife, and to remove the sod by hand. Neither of these alternatives is satisfactory because one involves the relatively great expense of procuring a separate sod cutting tool, and the other involves danger to one's personal safety should the knife slip while the relatively heavy forces needed for sod cutting are being applied.

A natural solution for this problem was for the gardening enthusiast to try to use one of the commonly available lawn edging tools for this purpose, but this solution proved unsatisfactory because of the fact that all of such edging tools were adapted to have the cutting member, whether a blade or rotating cutter, penetrate the sod for a distance of approximately one-half inch below the sidewalk level, which is all that is needed for edging the lawn, and they were not intended to cut deep enough to go below root level, and thus, allow easy removal of the sod, therefore, this solution proved impractical. Thus, if one desired to cut sod for a garden, and to edge one's lawn, the purchase of two tools at relatively great expense was a necessity. However, I have now solved this problem after much thought in a relatively simple and inexpensive manner.

Thus, one of the objects of the present invention is to provide a dual purpose lawn and garden tool which can be used both for cutting sod and for lawn edging with relative ease.

Another object of the present invention is to eliminate the necessity for purchasing separate tools for lawn edging and sod cutting.

Another object of the present invention is to provide a lawn edging tool which is easily modifiable to perform the job of sod cutting.

A still further object of the present invention is to provide a tool of the above mentioned nature, which, when used for the sod cutting function, has a cutting member which will cut the sod to below the root level, thus, facilitating its easy removal.

A still further object of the present invention is to provide a dual purpose lawn and garden tool whereby the tool may be converted from its sod cutting function to its lawn edging function by the removal of one sod cutting wheel and the addition of one lawn edging wheel.

Another object of the present invention is to provide a spacing member for my dual purpose lawn and garden tool which may be mounted thereon when it is used for its lawn edging function so that the desired width of edging around the lawn may be easily obtained.

A still further object of the present invention is to provide a deflector member which may be mounted at the rear of the frame member of my tool to direct the portion of the grass which has been removed away from the newly edged lawn on to the sidewalk, and thus, provide a neat appearance to the lawn.

Further objects and advantages of this invention will be apparent from the following description and appended claims, references being had to the accompanying drawings forming a part of the specification, wherein like reference characters designate corresponding parts in the several views.

FIG. 4 is a sectional view taken in the direction of the arrows on the section line 4—4 of FIG. 2.

FIG. 6 shows an alternate embodiment of the portion of my invention shown in FIG. 4, showing the use of a wider spacer member.

Figure 1:
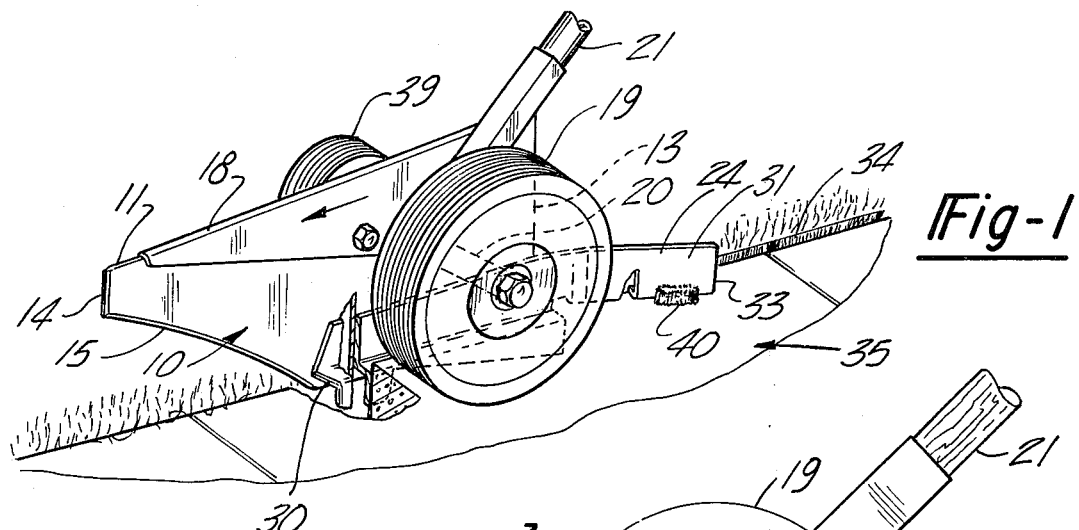
FIG. 1 is a perspective view of an embodiment of my improved dual purpose lawn and garden tool showing it being used in its lawn edging mode.

It is to be understood that the invention is not limited in its application to the details of construction and arrangement of parts illustrated in the accompanying drawings, since the invention is capable of other embodiments, and of being practiced and carried out in other ways within the scope of the invention. Also, it is to be understood that the phraseology and terminology used is for the purpose of description and not of limitation.

My invention, when used for lawn edging, consists of a structural frame member generally designated by the numeral 10, which is of relatively thin cross section and is preferably made out of some sheet material such as aluminum or steel. The frame member 10 is of generally rectangular configuration and has an upper edge 11 and a lower edge 12, together with a trailing edge 13, and a leading edge consisting of two portions, an upper straight portion 14 and a lower curved portion 15, both of which are sharpened to a knife-like edge. Since the frame member 10 is made of relatively thin cross section, a stiffening member 18 having a lip portion 16 and an elongated downwardly extending portion 17 is placed over the top edge 11 thereof.

When it is desired to use my invention for lawn edging, a suitable supporting wheel 19 is removably but rotatably mounted on an axle 20, which forms a portion of the fastening means for a suitable handle 21, when it is passed through a hole provided through the stiffening member 18 and the frame member 10. A second fastening means, such as a bolt and nut 22, is used to firmly secure the handle 21 in place. It is not believed that additional description of the handle 21 is needed as any handle of sufficient strength may be used.

Figure 2:
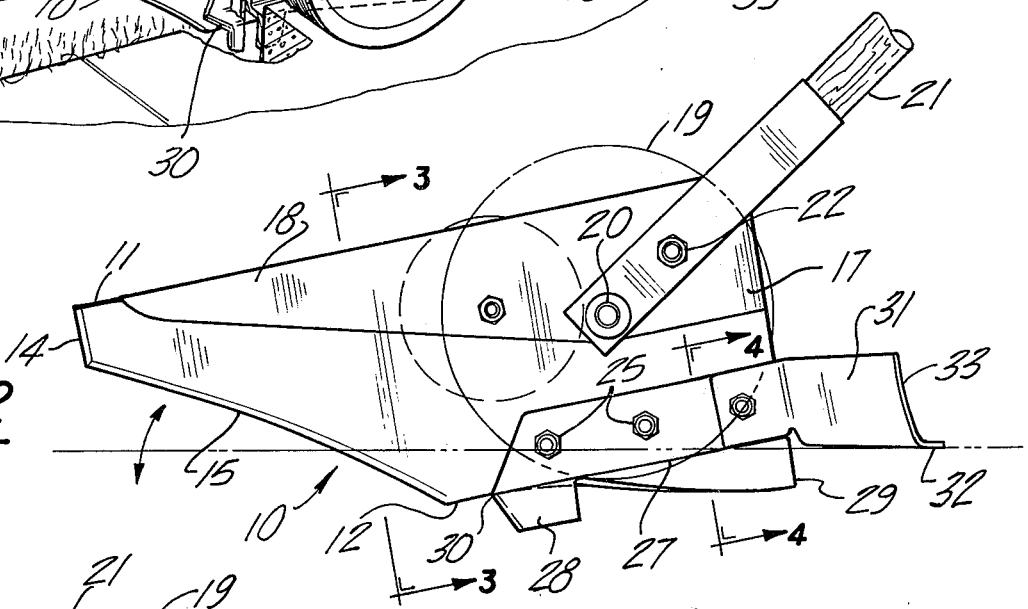
FIG. 2 is a plan view of my improved lawn and garden tool.
Figure 5:
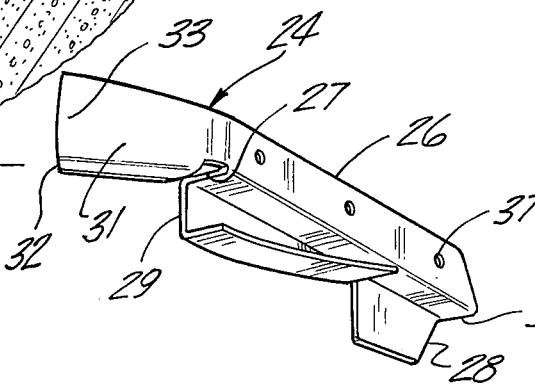
FIG. 5 is a perspective view of the spacer member adapted to be attached at the lower edge of the frame member of the dual purpose lawn and garden tool of the present invention.

A spacer member generally designated by the numeral 24 is provided and attached by suitable fastening means, such as the nuts and bolts 25, by its flange portion 26 along the lower edge 12 of the frame member 10, with its ramp portion 27 parallel to the upper edge of the frame member. A second spacing flange 28 and a guiding member 29 extend below the ramp surface 27 of the spacer member, with the forward edge of the ramp surface 27, indicated by the numeral 30, being sharpened to form a cutting edge. A deflector flange 33 is attached to the rear of the spacer member 24 to deflect the pieces of sod which have been cut from the edges of the lawn, away from the lawn edge 34 and deposit them cleanly on the sidewalk 35. The deflector flange may be a separate part of my device, as shown in FIG. 2, or may be an integral part of the spacer member 24 as shown in FIG. 5.

In operation, my dual purpose lawn and garden tool, when operated in its edging mode, is placed proximately to the edge of the sidewalk 35, and a downward force is applied on the handle 21 causing the lower leading edge 15 of the frame member 10 to cut into lawn 34 at a distance Y away from the sidewalk 35 depending on the width of the spacer member 24. Continued force on the handle 21 causes the edge 15 to sink to a depth determined by the size of the wheel 19 and the design of the deflector member 33 which will now be resting on the sidewalk 35 by means of its load bearing surface 32.

Continued forward pressure will bring the cutting edge 30 in contact with the edge of the lawn 34, and will cause the cutting edge 30 and the leading edge 15 of the frame member 10, in cooperation, to begin cutting rectangular pieces of sod from the lawn. These pieces of sod are guided up the ramp surface 27 of the spacer member 34 until they contact the deflector flange 33, and more particularly, surface 31 thereof. Without the deflector bar 33, the pieces of sod would be re-deposited in the trench left between the lawn edge 34 and the sidewalk 35 making for a very untidy job, and additional clean up work; but with the deflector bar guiding the sod over the trench between the lawn and the sidewalk, the piece of sod 40 is neatly deposited on the sidewalk 35.

Figure 3:
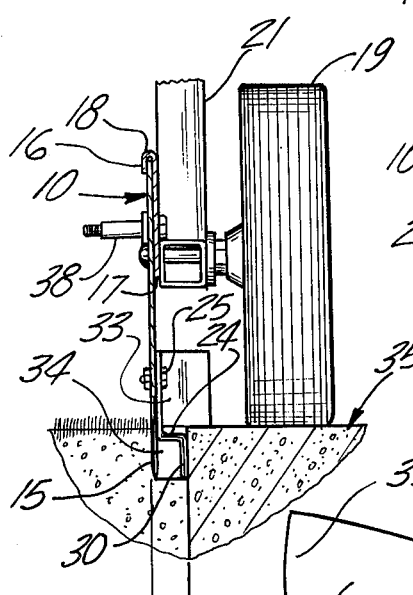
FIG. 3 is a sectional view taken in the direction of the arrows on the section line 3—3 of FIG. 2.

Referring now specifically to FIG. 3, it can be seen that the spacer member can be made of any desired width, such as indicated by the letter Y, or referring to FIG. 6, X, or any other width which is desired and practical. Thus, any desired width of the trench, or in other words, any desired distance of trimming the edge of the lawn 34 away from the sidewalk 35, can be had.

Referring now to FIG. 5, therein is shown the spacer member 24 in greater detail, showing the attachment flange 26 by which the spacer member 24 is attached to the frame member 10 by fastening means 25 passed through the holes 37, with the cutting edge 30 of the ramp portion 27 being clearly shown, as is the spacing flange 28. FIG. 6 shows, in a view similar to FIG. 4, a wider spacer member.

Figure 7:
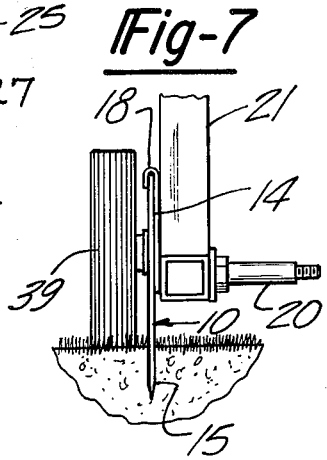
FIG. 7 is a partial cut-away view of an embodiment of my invention adapted for the purposes of sod cutting.

Referring now specifically to FIG. 7, when it is desired to use my improved dual purpose lawn and garden tool for sod cutting rather than lawn edging, the spacer member 24 and the large supporting wheel 19 are removed, and a small wheel 39 is placed over a second axle 38 (see FIG. 3) and rotatably attached thereto. In this embodiment, downward pressure on the handle 21 will immediately force the lower leading edge 15 of the frame member 10 into the sod it is desired to cut, making a clean cut therein in a very simple and easy fashion without the use of a separate sod cutting tool. Continued pressure on the handle 21 will move my tool forward on the small supporting wheel 39, and any desired shape of cut can be made simply by removing and re-inserting my tool whenever a change in direction is desired.

Whether my tool is used for sod cutting or lawn edging the sharpened upper leading edge 14 can aid in making the first cut of the sod, thereby starting the tool in an easy manner. It should be understood that the small wheel 39 and small axle 38 can be left attached to my improved tool during lawn edging operations if desired, but it is preferred that it be removed to avoid any possible interference. Thus, by virtue of the above disclosed discussion, the objects of the present invention listed above and numerous additional advantages are obtained.

I claim:

1. A dual-purpose lawn and garden tool for the purposes of cutting sod and edging the portion of the lawn adjacent the sidewalk and the like, said tool including a structural frame member of thin cross section having a sharpened leading edge consisting of a short vertical portion and a rearwardly extending concave portion, an upper edge adapted to receive a stiffening member, and a lower edge, a stiffening member having a lip portion and a downwardly extending elongated portion, with said lip portion engaging said upper edge of said frame member, a suitable handle adapted to be attached to said frame member through said stiffening member, a plurality of fastening means to attach said handle to said frame member through said stiffening means, an axle attached to said frame member through said stiffening member ahead of any of said fastening means, a small support wheel removably mounted to said axle, and wherein one of said fastening means is located proximate the lower extremity of said handle, and has an axle-like portion extending parallel to said axle, but in the opposite direction, and including a second larger lawn edging wheel rotatably mounted on said axle-like portion for support of said structural member only, but adapted to be easily removed therefrom when desired.

2. The device defined in claim 1, and including a spacer member which is adapted, when in use, to determine the width of cut made in the sod adjacent the sidewalk.

3. The device defined in claim 2, wherein said spacer member includes a horizontal ramp portion having a leading edge, an attaching flange extending vertically upwardly from said ramp portion, a spacing flange extending vertically downward from a portion of said ramp opposite said attaching flange, and a guiding member extending downwardly from said attachment flange rearward of said spacing flange.

4. The device defined in claim 3, wherein the spacer member is attached to said frame member with suitable fastening means proximate to the lower edge thereof in a manner to assure that said ramp portion of said spacer member is parallel with said upper edge of said frame member.

5. The device defined in claim 4, and including a deflector flange attached at the rear of said frame member adjacent said spacer member and having a deflecting portion and a loading bearing portion, with said deflecting portion being adapted to guide the sod cut from adjacent the edge of the sidewalk during forward motion of the tool by the cooperation of the leading edges of said frame member and said spacer member over and away from the edge of the sidewalk after it has traveled up the ramp portion of said spacer member, and the load bearing portion thereof, being adapted, in cooperation with said larger wheel to stabilize said tool during use and to tip it at a predetermined angle.

6. The device defined in claim 5, wherein said deflector member is an integral part of said spacer member.

* * * * *